United States Patent
Shiu et al.

(10) Patent No.: US 8,618,748 B2
(45) Date of Patent: Dec. 31, 2013

(54) POWER CONVERTING CONTROLLER AND LIGHT-EMITTING DIODE DRIVING CIRCUIT

(75) Inventors: Shian-Sung Shiu, New Taipei (TW); Chung-Che Yu, New Taipei (TW); Li-Min Lee, New Taipei (TW); Ke Peng, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 111 days.

(21) Appl. No.: 13/192,466

(22) Filed: Jul. 28, 2011

(65) Prior Publication Data

US 2012/0104968 A1 May 3, 2012

(30) Foreign Application Priority Data

Oct. 29, 2010 (CN) .......................... 2010 1 0530351

(51) Int. Cl.
*H05B 37/02* (2006.01)
*G05F 1/00* (2006.01)

(52) U.S. Cl.
USPC .......................................... 315/307; 315/291

(58) Field of Classification Search
USPC .............. 315/291, 307, 224, 312; 363/21.02, 363/21.03, 21.04, 21.06, 21.07, 21.08, 363/21.09
See application file for complete search history.

(56) References Cited

U.S. PATENT DOCUMENTS

| | | | |
|---|---|---|---|
| 6,259,615 B1 * | 7/2001 | Lin | 363/98 |
| 7,446,988 B2 * | 11/2008 | Balakrishnan et al. | 361/18 |
| 7,550,934 B1 | 6/2009 | Deng et al. | |
| 2008/0012510 A1 * | 1/2008 | Po | 315/308 |
| 2009/0167186 A1 | 7/2009 | Ghanem | |
| 2009/0180302 A1 * | 7/2009 | Kawabe et al. | 363/21.01 |
| 2009/0289567 A1 * | 11/2009 | Kobayashi | 315/241 R |
| 2009/0295776 A1 * | 12/2009 | Yu et al. | 345/212 |
| 2010/0213866 A1 * | 8/2010 | Zhai et al. | 315/291 |

FOREIGN PATENT DOCUMENTS

| | | |
|---|---|---|
| CN | 1953632 | 4/2007 |
| CN | 101207958 | 6/2008 |
| CN | 101316469 | 12/2008 |

(Continued)

OTHER PUBLICATIONS

"First Office Action of China counterpart application" issued on Sep. 29, 2013, pp. 1-11, in which the listed references were cited.

(Continued)

*Primary Examiner* — Minh D A
(74) *Attorney, Agent, or Firm* — Jiang Chyun IP Office

(57) ABSTRACT

A power converting controller and an LED driving circuit are provided. The power converting controller controls a converting circuit, which converts an input power source into an appropriate power source to drive a load. The power converting controller includes a feedback control unit, an open-circuit judging unit and a protection unit. The feedback control unit controls the converting circuit according to a feedback signal representing the status of the load. As the open-circuit judging unit has judged that the load is continuously in an open-circuit status for a predetermined time length, the open-circuit judging unit generates an open-circuit protection signal. The protection unit is coupled to the feedback control unit and the open-circuit judging unit so as to generate a protection signal as receiving the open-circuit protection signal and thereby the feedback control unit enters a latch status to stop controlling the converting circuit.

14 Claims, 3 Drawing Sheets

(56) References Cited

FOREIGN PATENT DOCUMENTS

| | | |
|---|---|---|
| CN | 201210761 | 3/2009 |
| CN | 201360368 | 12/2009 |
| CN | 201369862 | 12/2009 |
| CN | 201438772 | 4/2010 |
| CN | 101711070 | 5/2010 |
| CN | 101832490 | 9/2010 |
| TW | 478240 | 3/2002 |
| TW | 200709737 | 3/2007 |
| TW | 200950589 | 12/2009 |
| TW | 201010507 | 3/2010 |

OTHER PUBLICATIONS

"Office Action of Taiwan counterpart application" issued on Sep. 24, 2013, pp. 1-8, in which the listed references were cited.

* cited by examiner

POWER CONVERTING CONTROLLER AND LIGHT-EMITTING DIODE DRIVING CIRCUIT

CROSS-REFERENCE TO RELATED APPLICATION

This application claims the priority benefit of China application serial no. 201010530351.5, filed Oct. 29, 2010. The entirety of the above-mentioned patent application is hereby incorporated by reference herein and made a part of this specification.

BACKGROUND OF THE INVENTION

1. Field of the Invention

The invention generally relates to a power converting controller and a light-emitting diode driving circuit, and more particularly, to a power converting controller and a light-emitting diode driving circuit with open-circuit protection function.

2. Description of Related Art

In comparison with a traditional illumination light source, light-emitting diodes (LEDs) have advantages of high light-emitting efficiency, low power consumption and long lifetime, and the production cost thereof is being steadily reduced, so that people more and more broadly adopt the LEDs. An LED driving circuit usually is an isolated or a non-isolated constant-current power to drive a light-emitting diode string (LED string) and controls the current flowing through the LEDs through detecting current.

FIG. 1 is a schematic circuit diagram of a traditional LED driving circuit. Referring to FIG. 1, an LED driving circuit includes a controller 10, a converting circuit 35, a power feedback circuit 40 and an LED string 30. In the example case, the converting circuit 35 is a buck converting circuit, which includes an inductor L, a capacitor C, a rectifying diode D and a switch SW. The converting circuit 35 is coupled to an input power source VIN at the input terminal thereof and to the LED string 30 at the output terminal thereof so as to drive the LED string 30 for emitting light. A current-detecting resistor R is coupled to the LED string 30 through the switch SW and generates a current-detecting signal IFB according to the current flowing through the LED string 30. The current-detecting terminal CS of the controller 10 receives the current-detecting signal IFB and thereby generates a control signal 'Gate' at the driving terminal DRV thereof for switching the switch SW of the converting circuit 35 and further controlling the converting circuit 35 to convert the power. In this way, the LED string 30 can stably emit light. The converting circuit 35 charges an initial capacitor Cin through the power feedback circuit 40 as switching the switch SW. The initial capacitor Cin is coupled to the driving voltage terminal VDD of the controller 10 so as to provide the power to the controller 10.

In a traditional LED driving circuit, such as the one of FIG. 1, the circuit does not specifically detect whether or not the LED string is open-circuit, instead, employs the under-voltage lock out protection (UVLO protection) of the controller 10 to achieve the open-circuit protection function.

In more details, if any LED in the LED string 30 is damaged, it would causes open-circuit. When the LEDs occur open-circuit, even the switch SW is turned on, the current is unable to flow through the inductor L via the LED string 30, and it is unable to store the energy in the inductor L as well, which results in gradually reducing the stored energy (voltage) of the initial capacitor Cin. When the voltage is reduced to a voltage value of UVLO protection of the controller 10, the controller 10 is triggered to execute the UVLO protection so that the controller enters a latch status.

In the practical applications however, sometimes, the input power source VIN may be unstable for a while, in particular, when the input power source VIN is formed by rectifying the commercial power. When the unstable input power source VIN causes the voltage of LED string 30 lower than the minimum turn-on voltage, the LED string 30 fails conducting the current, this situation is equivalent to the above-mentioned situation where the LED string 30 occurs open-circuit, which would trigger the UVLO protection of controller 10 and enter a latch status. The controller 10 will remain in a latch status even when the input power source VIN resumes to the stable situation, which makes the LED string 30 abnormally stop lighting.

SUMMARY OF THE INVENTION

The scheme of the conventional open-circuit protection is unable to effectively distinguish an LED open-circuit from an unstable input power source, so that the prior art is unable to precisely implement the protection, in which any unstable power supply would result in fault actions of the LED driving circuit to make the LEDs stop lighting. Accordingly, the invention introduces a specific open-circuit protection unit in the LED driving controller to singly detect and judge whether the circuit needs an open-circuit protection and thus distinguishes the open-circuit protection from the under-voltage protection. Based on the idea, the invention also introduces a function of input power source sensing, so that the controller can more precisely identify and respond to the unstable situation of the input power source. In addition, the controller of the invention can also be easily applied in any circuit other than the LED driving circuit for converting power and driving different loads.

To achieve the above-mentioned objectives, the invention provides a power converting controller for controlling a converting circuit, which converts an input power source into an appropriate power source to drive a load. The power converting controller includes a feedback control unit, an open-circuit judging unit and a protection unit. The feedback control unit controls the converting circuit according to a feedback signal representing the status of the load. As the open-circuit judging unit has judged out the load is continuously in an open-circuit status for a predetermined time length, the open-circuit judging unit generates an open-circuit protection signal. The protection unit which is coupled to the feedback control unit and the open-circuit judging unit receives the open-circuit protection signal and generates a protection signal so as to make the feedback control unit enters a latch status to stop controlling the converting circuit.

The invention also provides an LED driving circuit, which includes an LED module, a converting circuit and a power converting controller. The converting circuit is for converting an input power source into an appropriate power source to drive the LED module for emitting light. The power converting controller controls the converting circuit to convert the power according to a feedback signal representing the status of the LED module. As the power converting controller has judged that the LED module is continuously in an open-circuit status for a predetermined time length, the power converting controller executes an open-circuit protection function to stop the converting circuit converting power, in addition, the power converting controller also detects the voltage of the input power source so as to pause the open-circuit protection function when the input voltage is lower than a predetermined under-voltage threshold.

The above-mentioned depiction and the following detailed features are exemplary ones for further explaining the claim scope of the invention. The other objectives and advantages of the invention will be further understood from the further technological features disclosed by the embodiments and the accompanying diagrams of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
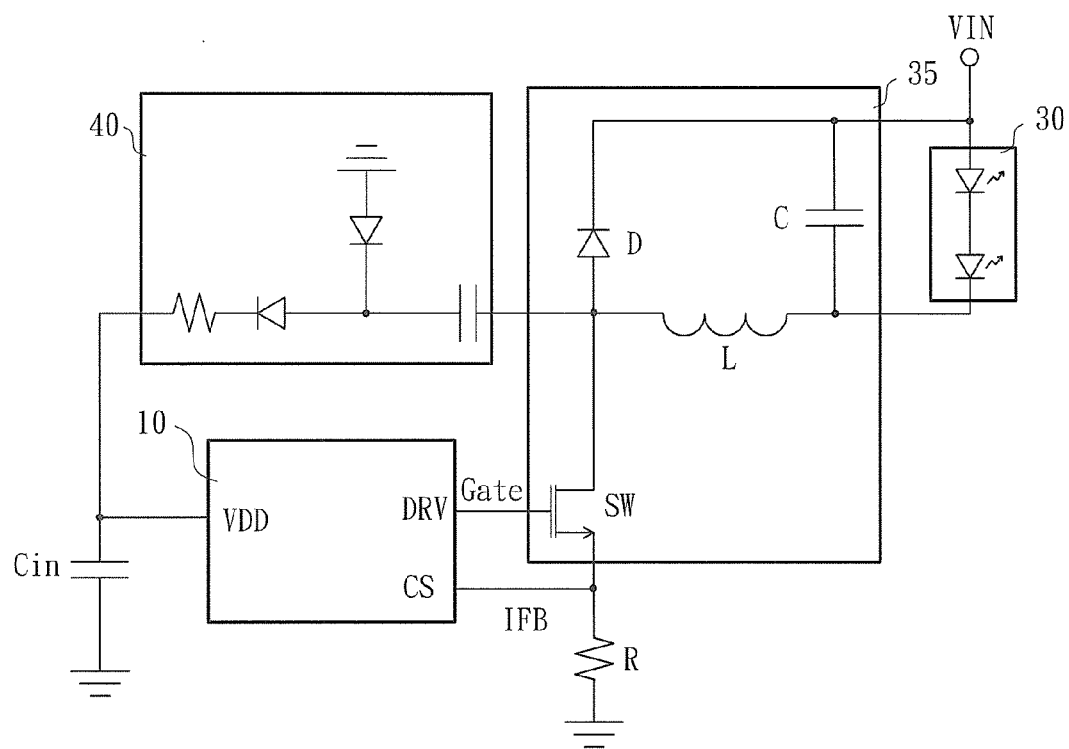
FIG. 1 is a schematic circuit diagram of a traditional LED driving circuit.

Reference will now be made in detail to the preferred embodiments of the invention, examples of which are illustrated in the accompanying drawings. Wherever possible, the same reference numbers are used in the drawings and the description to refer to the same or like parts.

Figure 2:
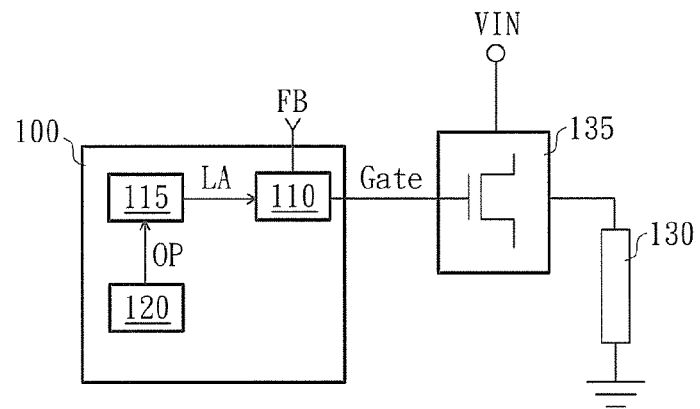
FIG. 2 is a schematic circuit diagram of a power converting circuit according to the invention.

FIG. 2 is a schematic circuit diagram of a power converting circuit according to the invention. Referring to FIG. 2, a power converting circuit includes a power converting controller 100, a converting circuit 135 and a load 130. The converting circuit 135 is a switching converting circuit and includes at least a switch so as to convert an input power source VIN into an appropriate voltage source or a current source for driving the load 130 according to (at least) a control signal Gate of the power converting controller 100.

The power converting controller 100 includes a feedback control unit 110, an open-circuit judging unit 120 and a protection unit 115. The feedback control unit 110 generates the control signal Gate to control the converting circuit 135 according to a feedback signal FB representing the electrical status of a load 130, in which the electrical status of the load 130 can be a voltage applied to or a current flowing through the load 130 which can reflect the driven situation of the load 130 and the feedback signal FB is just a detection signal representing the above-mentioned electrical status. As the open-circuit judging unit 120 has judged that the load 130 is in an open-circuit status for a predetermined time length, the open-circuit judging unit 120 generates an open-circuit protection signal OP. The judgment of the open-circuit status is based on a detection signal of the load (for example, the above-mentioned feedback signal FB) to judge whether the voltage of the load is higher than a reasonable driving voltage range or whether the current of the load is lower than a reasonable driving current range, or is based on the internal signal of the feedback control unit 110, for example, whether the operation period of the pulse-width modulation signal is too long or too short, or whether the frequency of the pulse-width modulation signal is too high or too low and whether or not the above-mentioned situation lasts for the predetermined time length. The predetermined time length herein is for avoiding a possible wrong judgment of open-circuit due to unstable input power source VIN or other temporary circuital abnormities. When the above-mentioned conditions are satisfied, the open-circuit judging unit 120 outputs an open-circuit protection signal OP to the protection unit 115. The protection unit 115 is coupled to the feedback control unit 110 and the open-circuit judging unit 120. When receiving the open-circuit protection signal OP, the protection unit 115 generates a protection signal LA to make the feedback control unit 110 enter a latch status to stop outputting the control signal Gate, i.e., to stop controlling the converting circuit so that the converting circuit stops transmitting the power from the input power source VIN to the output terminal. Only after the power converting controller 100 is reset, the feedback control unit 110 in the latch status can be released from the latch status thereof to resume the normal operation.

Figure 3:
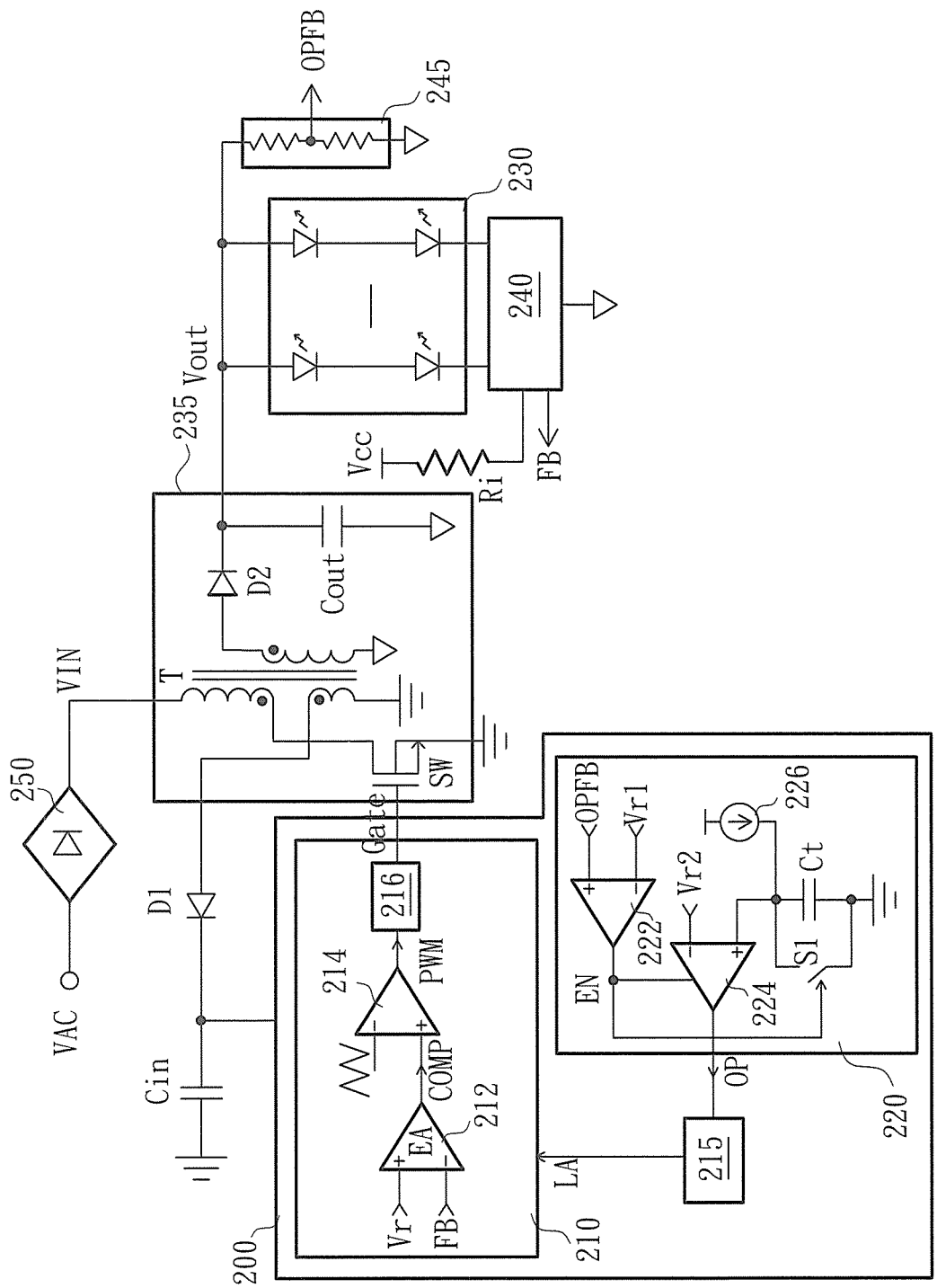
FIG. 3 is a schematic circuit diagram of an LED driving circuit according to a first preferred embodiment of the invention.

FIG. 3 is a schematic circuit diagram of an LED driving circuit according to a first preferred embodiment of the invention. Referring to FIG. 3, an LED driving circuit includes a power converting controller 200, a converting circuit 235 and an LED module 230. The converting circuit 235 includes a switch SW, a transformer T, a rectifying diode D2 and an output capacitor Cout, and in the embodiment, the converting circuit 235 is a fly-back converting circuit. The primary side of the transformer T is coupled to an input power source VIN and the switch SW. The secondary side of the transformer T makes the power which is rectified by the rectifying diode D2 store in the output capacitor Cout, in which the input power source VIN is formed by rectifying an AC power through a bridge rectifier 250. In the embodiment, the LED module 230 is composed of a plurality of LED strings, in which in order to ensure a roughly equal current flows through each LED string, an additional current-sharing circuit 240 is disposed and coupled to each of the LED strings in the LED module 230 so that the current flowing through each the LED string is roughly equal to each other, A current-setting resistor Ri is coupled to a setting voltage Vcc to define a setting current flows through the current-setting resistor Ri. Moreover, the setting current is mirrored to each LED strings through the current-sharing circuit 240. The current-sharing circuit 240 includes a minimum voltage detection function to output the minimum voltage serving as the feedback signal FB at the negative terminals of the LED strings (i.e., in the terminals coupled to the current-sharing circuit 240), so that the driving efficiency of the LED driving circuit keeps at a higher level.

The power converting controller 200 includes a feedback control unit 210, an open-circuit judging unit 220 and a protection unit 215. The feedback control unit 210 generates a control signal Gate for controlling the converting circuit 235 according to the feedback signal FB. A voltage-divider 245 is connected to the output terminal of the converting circuit 235 so as to generate an open-circuit detection signal OPFB according to an output voltage Vout of the converting circuit 235. The open-circuit judging unit 220 receives the open-circuit detection signal OPFB and judges whether or not the open-circuit detection signal OPFB is too high. If the open-circuit detection signal OPFB is too high, a timing operation starts. As the open-circuit detection signal OPFB is too high and the status lasts for a predetermined time length, the open-circuit judging unit 220 outputs an open-circuit protection signal OP. When the protection unit 215 receives the open-circuit protection signal OP, the protection unit 215 generates a protection signal LA to make the feedback control unit 210 enter a latch status to stop outputting the control signal Gate. After all, in addition to receiving the open-circuit protection signal OP of the open-circuit judging unit 220, the protection unit 215 can also receive the protection signals of other protection detection units, for example, an output under-voltage lock-out protection signal, an over-current protection signal, an under-current protection signal and an input under-voltage protection signal. At the time, against different protection signals, the protection unit 215 would execute a temporary protection function (i.e., after the abnormal status is removed, the operation is resumed) or a latch protection function (i.e., the operation is resumed only after restarting the power converting controller). The operations of the feedback control unit 210 and the open-circuit judging unit 220 are described in more details as follows.

The feedback control unit 210 includes an error amplifier 212 and a pulse-width modulator 214. The non-inverting input terminal of the error amplifier 212 receives a reference voltage signal Vr and the inverting input terminal thereof receives the feedback signal FB so as to output an error amplifying signal COMP at the output terminal. The pulse-width modulator 214 receives the error amplifying signal COMP and a triangle-wave signal to thereby generate a pulse-width modulation signal PWM. A driving circuit 216 generates the control signal Gate according to the pulse-width modulation signal PWM to control the switch SW in the converting circuit 235 for switching. The feedback signal FB is generated according to the minimum voltage among the negative terminals of the LED strings, so that the minimum voltage among the negative terminals can keep at a predetermined minimum voltage value to advance the efficiency of the LED driving circuit.

The open-circuit judging unit 220 includes an open-circuit comparator 222, a timing comparator 224, a current source 226, a timing switch S1 and a timing capacitor Ct. When any LED in the LED module 230 makes the corresponding LED string open-circuit due to LED damaged, the voltage at the negative terminal corresponding to the LED string with damaged LED would be lower than the predetermined minimum voltage value. At the time, the power converting controller 200 increases the output voltage Vout to try increasing the voltage at the negative terminal of the LED string with damaged LED to the predetermined minimum voltage value. The above-mentioned operation would make the output voltage Vout higher than a reasonable range and thereby the level of the open-circuit detection signal OPFB is higher than the first reference level Vr1. At the time, the open-circuit comparator 222 outputs an enabling signal EN to enable the timing comparator 224 and meanwhile turn off the timing switch S1, and the current source 226 would start charging the timing capacitor Ct. When the lasting time of the above-mentioned abnormal situation is equal to the predetermined time length, the voltage of the timing capacitor Ct would be equal to a second reference level Vr2 to make the timing comparator 224 output the open-circuit protection signal OP. If the lasting time of the above-mentioned abnormal situation is less than the predetermined time length, the open-circuit comparator 222 in the course would stop outputting the enabling signal EN so that the timing switch S1 is turned on to reset the voltage of the timing capacitor Ct to be zero. As long as the predetermined time length is set to be greater than the lasting time length of some temporary abnormal situation of the circuits, the temporary abnormal situation of the circuits, for example, unstable power supply of the input power source VIN, can be excluded, which avoids the LED module 230 from abnormally stopping lighting due to wrong judgement. It should be noted that the predetermined time length is defined according to the capacity of the timing capacitor.

The transformer T in the embodiment has an auxiliary coil to provide energy to be stored into an initial capacitor Cin through an input diode D1 during the operation of the LED driving circuit so as to provide electric power for the operation of the power converting controller 200. When the LED module 230 gets open-circuit or due to other circuit abnormal situations so that the transformer T is unable to provide the energy to be stored in the initial capacitor Cin through the input diode D1, the power converting controller 200 may enter an under-voltage protection. Therefore, the initial capacitor Cin must have sufficient capacitance so that when an open-circuit abnormal situation or the like occurs, the power converting controller 200 can still keep for a time greater than the predetermined time length of the open-circuit judging unit 220. However, the power converting controller 200 can also be coupled to a power independently from the input power source VIN to receive a power required by the operation to reduce the request for capacity of the initial capacitor Cin.

Figure 4:
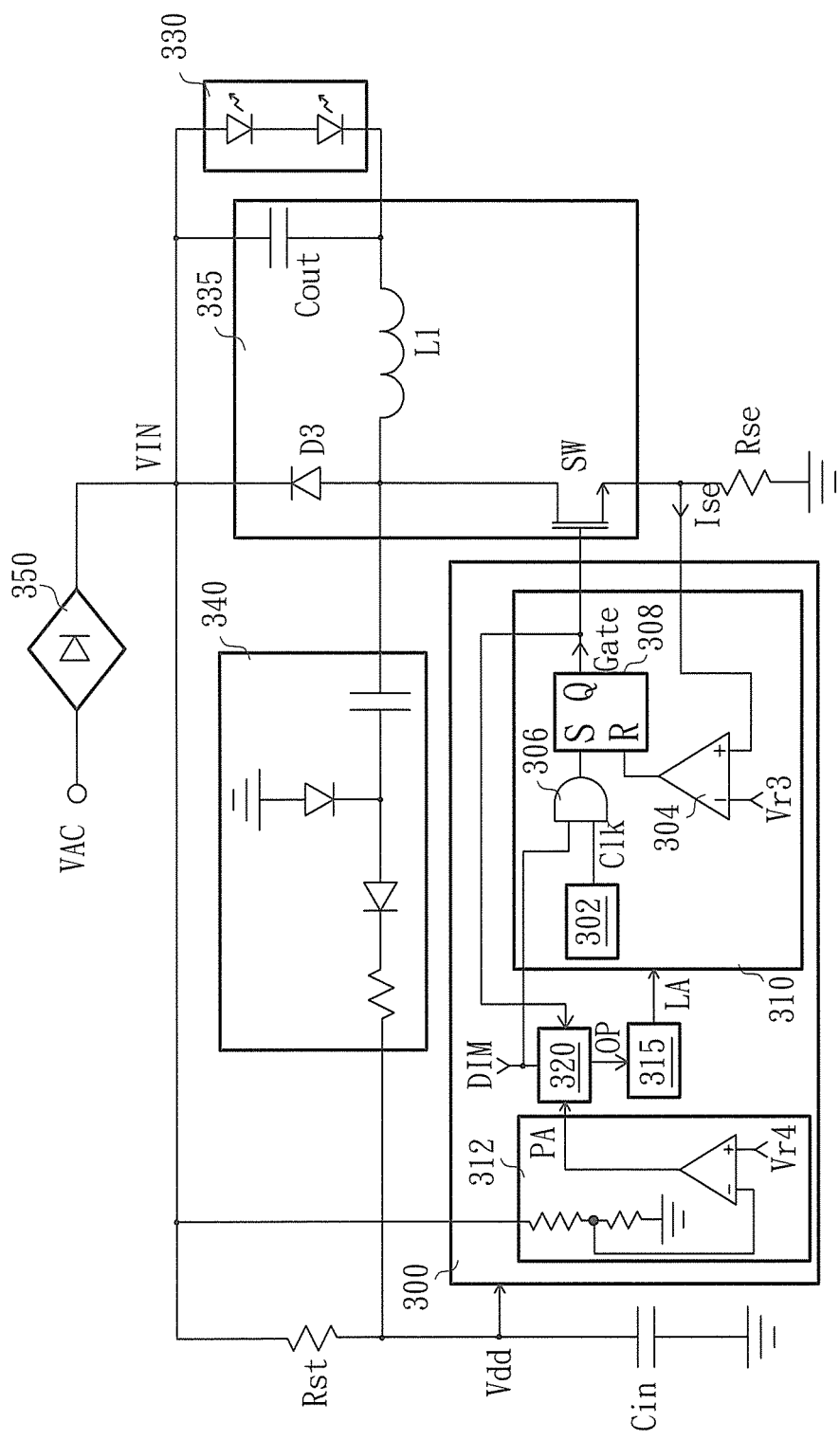
FIG. 4 is a schematic circuit diagram of an LED driving circuit according to a second preferred embodiment of the invention.

FIG. 4 is a schematic circuit diagram of an LED driving circuit according to a second preferred embodiment of the invention. Referring to FIG. 4, an LED driving circuit includes a power converting controller 300, a converting circuit 335 and an LED module 330. The converting circuit 335 includes a switch SW, an inductor L1, a rectifying diode D3 and an output capacitor Cout. In the embodiment, the converting circuit 335 is a buck converter to convert an input power source VIN into an appropriate power source to drive the LED module 330. The input power source VIN is formed by rectifying an AC power through a bridge rectifier 350. An initial capacitor Cin is coupled to the input power source VIN through a start resistor Rst so as to generate a supply voltage Vdd for the power converting controller 300. When the system is started to provide the input power source VIN, the electric energy is stored in the initial capacitor Cin through the start resistor Rst to start the power converting controller 300. When the power converting controller 300 starts to control the switching of the switch SW, the converting circuit 335 would additionally provide the power through the power feedback circuit 340 to keep the supply voltage Vdd, so that the power converting controller 300 can be continuously and normally operated.

The power converting controller 300 includes a feedback control unit 310, an input power detecting unit 312, an open-circuit judging unit 320 and a protection unit 315. The feedback control unit 310 includes a clock generator 302, a comparator 304, an AND gate 306 and an SR flip-flop 308. The clock generator 302 generates a clock signal Clk with a fixed period. The AND gate 306 receives a dimming signal DIM and the clock signal Clk so as to trigger the setting terminal S of the SR flip-flop 308 according to the clock signal Clk and the dimming signal DIM and generate a control signal Gate at the output terminal Q to turn on the switch SW. A current-detecting resistor Rse is coupled to the switch SW to detect the current flowing through the switch SW and generate a current-detecting signal Ise. The non-inverting input terminal of the comparator 304 receives the current-detecting signal Ise and the inverting input terminal receives a third reference voltage signal Vr3. When the switch SW is turned on, the level of the current-detecting signal Ise rises. When the level of the current-detecting signal Ise rises to the level of the third reference voltage signal Vr3, the comparator 304 outputs a high-level signal to the resetting terminal R of the SR flip-flop 308 so that the SR flip-flop 308 stops outputting the control signal Gate and the switch SW is turned off.

When the LED module 330 gets open-circuit, even the switch SW is turned on, there is no current flowing through the switch SW, which makes the comparator 304 unable to reset the SR flip-flop 308 and the SR flip-flop 308 would continuously output the control signal Gate. The open-circuit judging unit 320 simultaneously receives the control signal Gate and the dimming signal DIM and counts the time length according to the dimming signal DIM. When the time length for continuously generating the control signal Gate exceeds a predetermined pulse number of the dimming signal DIM, an open-circuit protection signal OP is generated. After the protection unit 315 receives the open-circuit protection signal OP, a protection signal LA is generated to make the feedback control unit 310 enter a latch status to stop outputting the control signal Gate. In the embodiment, the dimming signal DIM is a pulse dimming signal, but in the practice, the dimming signal DIM can be a DC value as well, in which according to the level of the DC dimming signal, the DC dimming signal is converted into the pulse dimming signal and is output to the open-circuit judging unit 320 for timing purpose.

In comparison with the embodiment of FIG. 3, the power converting controller 300 in the embodiment includes an additional input power detecting unit 312. The input power detecting unit 312 detects the voltage value of the input power source VIN. When the voltage value of the input power source VIN is lower than a predetermined low voltage value, a protection-pausing signal PA is generated and sent to the open-circuit judging unit 320 so that the open-circuit judging unit 320 pauses generating the open-circuit protection signal OP to avoid a wrong open-circuit judgement due to temporary unstable situation of the input power source VIN. Moreover, the protection-pausing signal PA of the input power detecting unit 312 can also be used to stop the operation of the open-circuit judging unit 320 or/and the protection unit 315, even stop the operation of the feedback control unit 310 to reduce the power consumption of the power converting controller 300. In this way, the power converting controller 300 can be avoided from entering an under-voltage protection prior to the open-circuit protection even the initial capacitor Cin with a lower capacitance so as to reduce the cost of the LED driving circuit.

The invention, as the depiction above, is totally satisfied with three elements of a patent: novelty, non-obviousness and industrial application. It will be apparent to those skilled in the art that the depictions above with preferred embodiments are for explaining the invention, not to be interpreted to limit the scope of the invention. In view of the foregoing, it is intended that any various modifications and substitutions equivalent to the embodiments still fall in the scope of the following claims of the invention without departing from the scope or spirit of the invention.

What is claimed is:

1. A power converting controller, for controlling a converting circuit to convert an input power source into an appropriate power source so as to drive a load; the power converting controller comprising:
   a feedback control unit, controlling the converting circuit according to a feedback signal representing the status of the load;
   an open-circuit judging unit, generating an open-circuit protection signal as judging that the load is continuously in an open-circuit status for a predetermined time length; and
   a protection unit, coupled to the feedback control unit and the open-circuit judging unit, and generating a protection signal as receiving the open-circuit protection signal and thereby making the feedback control unit enter a latch status to stop controlling the converting circuit.

2. The power converting controller as claimed in claim 1, wherein the predetermined time length is determined by the capacity of a timing capacitor.

3. The power converting controller as claimed in claim 1, wherein the load is a light-emitting diode module.

4. The power converting controller as claimed in claim 3, wherein the power converting controller further receives a dimming signal and controls the converting circuit with a dimming period so that the luminance of the light-emitting diode module is adjusted according to the dimming signal.

5. The power converting controller as claimed in claim 4, wherein the open-circuit judging unit sets the predetermined time length according to the dimming period.

6. The power converting controller as claimed in claim 3, further comprising an input power detecting unit coupled to the input power source for detecting an input voltage of the input power source, wherein as the input voltage is lower than a predetermined under-voltage value, the input power detecting unit outputs a protective pausing signal to make the open-circuit judging unit pause outputting the open-circuit protection signal.

7. The power converting controller as claimed in claim 6, wherein the power converting controller is further coupled to the converting circuit to receive an operation power.

8. The power converting controller as claimed in claim 7, wherein the input power detecting unit further outputs the protective pausing signal for stopping the operations of the protection unit.

9. A light-emitting diode driving circuit, comprising:
   a light-emitting diode module;
   a converting circuit, converting an input power source into an appropriate power source to drive the light-emitting diode module for emitting light; and
   a power converting controller, controlling the converting circuit to execute an power conversion according to a feedback signal representing the status of the light-emitting diode module, wherein as the power converting controller has judged that the light-emitting diode module is continuously in an open-circuit status for a predetermined time length, the power converting controller executes an open-circuit protection function to stop the converting circuit from executing the power conversion, wherein the power converting controller further detects an input voltage of the input power source so that when the input voltage is lower than a predetermined under-voltage value, the power converting controller pauses the open-circuit protection function.

10. The light-emitting diode driving circuit as claimed in claim 9, further comprising a rectifying circuit for rectifying and converting an AC input power source to the input power source.

11. The light-emitting diode driving circuit as claimed in claim 10, wherein the power converting controller is coupled to the converting circuit to receive an operation power.

12. The light-emitting diode driving circuit as claimed in claim 11, wherein the power converting controller comprises an input power detecting unit coupled to the input power source for detecting an input voltage of the input power source, wherein as the input voltage is lower than the predetermined under-voltage value, the input power detecting unit outputs a protective pausing signal to stop the open-circuit protection function.

13. The light-emitting diode driving circuit as claimed in claim 12, wherein the power converting controller further comprises an open-circuit judging unit for generating an open-circuit protection signal to make the power converting controller execute the open-circuit protection function as the open-circuit judging unit has judged that the light-emitting diode module is continuously in the open-circuit status for the predetermined time length.

14. The light-emitting diode driving circuit as claimed in claim 9, wherein as the input voltage is lower than the predetermined under-voltage value, the power converting controller stops the operation of a part of the circuit of the power converting controller so as to reduce the power consumption of the power converting controller.

\* \* \* \* \*